(12) United States Patent
Ma

(10) Patent No.: US 11,812,174 B2
(45) Date of Patent: Nov. 7, 2023

(54) DUAL-PROGRESSION PIXEL READOUT

(71) Applicant: Gigajot Technology, Inc., Glendale, CA (US)

(72) Inventor: Jiaju Ma, Monrovia, CA (US)

(73) Assignee: Gigajot Technology, Inc., Pasadena, CA (US)

( * ) Notice: Subject to any disclaimer, the term of this patent is extended or adjusted under 35 U.S.C. 154(b) by 0 days.

(21) Appl. No.: 18/174,546

(22) Filed: Feb. 24, 2023

(65) Prior Publication Data

US 2023/0217133 A1 Jul. 6, 2023

Related U.S. Application Data

(63) Continuation of application No. 17/715,825, filed on Apr. 7, 2022, now Pat. No. 11,595,609, which is a continuation of application No. 17/508,981, filed on Oct. 23, 2021, now Pat. No. 11,330,221.

(60) Provisional application No. 63/106,465, filed on Oct. 28, 2020.

(51) Int. Cl.
*H04N 25/75* (2023.01)
*H04N 25/46* (2023.01)

(52) U.S. Cl.
CPC ............ *H04N 25/75* (2023.01); *H04N 25/46* (2023.01)

(58) Field of Classification Search
None
See application file for complete search history.

(56) References Cited

U.S. PATENT DOCUMENTS

| | | | |
|---|---|---|---|
| 7,619,670 B2 | 11/2009 | Shah | |
| 8,294,774 B2 | 10/2012 | Yamamoto | |
| 8,417,058 B2 | 4/2013 | Tardif | |
| 8,446,507 B2 | 5/2013 | Boemler | |
| 9,100,600 B2 | 8/2015 | Hizi | |
| 11,595,609 B2 | 2/2023 | Ma | |
| 2009/0122168 A1 | 5/2009 | Chou | |
| 2010/0149390 A1 | 6/2010 | Huang et al. | |
| 2012/0127330 A1 | 5/2012 | Masaoka et al. | |
| 2013/0010153 A1* | 1/2013 | Kasai | H04N 25/447 348/222.1 |
| 2013/0076940 A1 | 3/2013 | Kimura | |
| 2016/0344957 A1 | 11/2016 | Kaehler | |
| 2020/0072644 A1 | 3/2020 | Masa et al. | |

OTHER PUBLICATIONS

WIPO International Searching Authority, "International Search Report and Written Opinion of the International Searching Authority," in connection with International Application No. PCT/US2021/056376, Jan. 24, 2022, 11 pages.

* cited by examiner

*Primary Examiner* — Mark T Monk
(74) *Attorney, Agent, or Firm* — Robert C. Kowert; Kowert, Hood, Munyon, Rankin & Goetzel, P.C.

(57) ABSTRACT

Row-by-row pixel read-out is executed concurrently within respective clusters of pixels of a pixel array, alternating between descending and ascending progressions in the intra-cluster row readout sequence to reduce temporal skew between neighboring pixel rows in adjacent clusters.

20 Claims, 3 Drawing Sheets

DUAL-PROGRESSION PIXEL READOUT

CROSS-REFERENCE TO RELATED APPLICATIONS

This application is a continuation of U.S. patent application Ser. No. 17/715,825, filed Apr. 7, 2022, which is a continuation of U.S. patent application Ser. No. 17/508,981 filed Oct. 23, 2021, now U.S. Pat. No. 11,330,221, which claims the benefit of U.S. provisional application No. 63/106,465 filed Oct. 28, 2020, which are hereby incorporated by reference herein in their entirety.

TECHNICAL FIELD

The disclosure herein relates to integrated-circuit image sensors.

BRIEF DESCRIPTION OF DRAWINGS

The various embodiments disclosed herein are illustrated by way of example, and not by way of limitation, in the figures of the accompanying drawings and in which like reference numerals refer to similar elements and in which.

DETAILED DESCRIPTION

In various integrated-circuit image sensor embodiments disclosed herein, row-by-row pixel read-out is executed concurrently within respective clusters of pixels, alternating the between descending and ascending progressions in the intra-cluster row readout sequence ("row scan") to reduce temporal skew between neighboring pixel rows in adjacent clusters. In "center-converge" ("outside-in") embodiments, intra-cluster row scan progresses alternately from the outer ("top" and "bottom") rows of the cluster toward interior rows, while the opposite occurs in "center-diverge" ("inside-out") embodiments, with row-scan starting at an interior row and progressing alternately/bi-directionally toward the top and bottom rows of each cluster. In yet other embodiments, the row-scan sequence varies from cluster to cluster, for example with outside-in row-scans starting from the bottom row in one cluster and from the top row in an adjacent cluster. In any case, the read-out delay between abutting rows in neighboring clusters—referred to herein as inter-cluster skew—is reduced relative to conventional single-progression (monotonic) readout sequences as the dual/multiple progressions ensure that pixel rows at cluster boundaries are read out in successive or concurrent row readout intervals.

Figure 1:
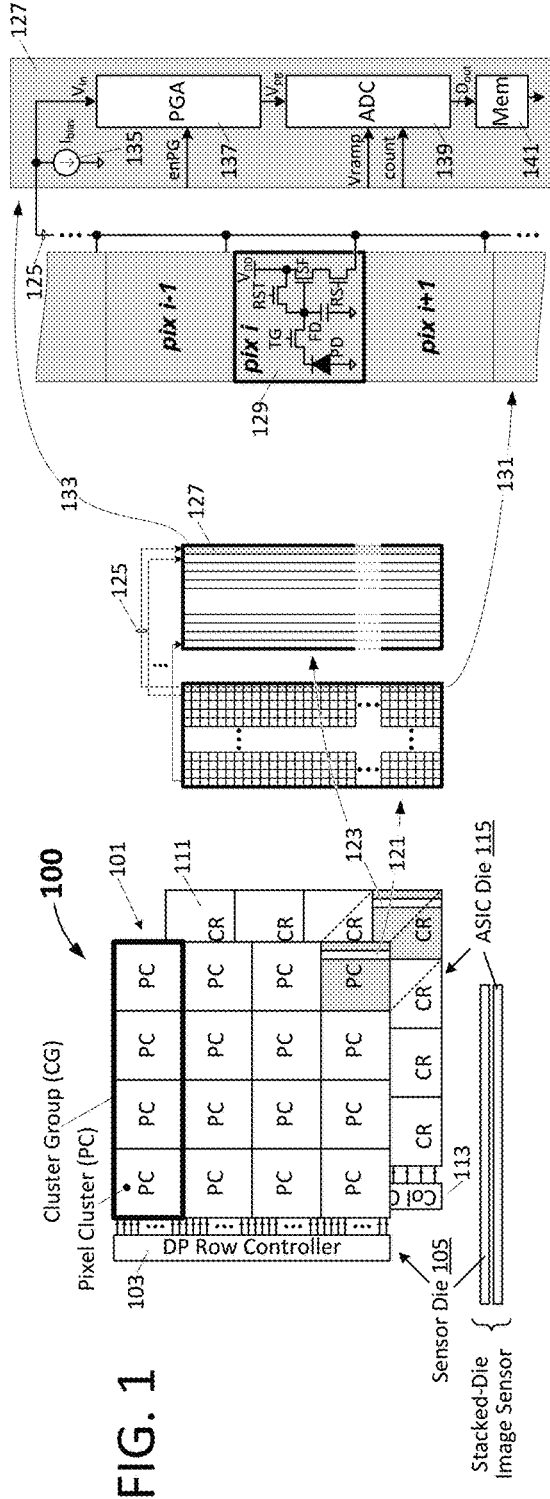
FIG. 1 illustrates an embodiment of an integrated-circuit image sensor that executes cluster-parallel pixel readout with dual (bi-directional) per-cluster scan progressions to reduce inter-cluster skew.

FIG. 1 illustrates an embodiment of an integrated-circuit image sensor 100 that executes cluster-parallel pixel readout with dual (bi-directional) per-cluster scan progressions to reduce inter-cluster skew. In the example shown, a cluster-based pixel array 101 and dual-progression row controller 103 are implemented in a sensor die 105, while per-cluster readout circuits 111 ("CR"—one per pixel cluster) and a column control circuit 113 are implemented in ASIC die 115. The two dies 105 and 115 overlay one another to form a die stack with conductive interconnects between pixel outputs and cluster-readout circuit inputs.

In the depicted embodiment, each pixel cluster (PC) within sensor die 105 constitutes a sub-array of pixels (a respective portion/region of pixel array 101), with each row-aligned group of pixel clusters ("cluster group," CG) coupled in common to row-control lines extending from dual-progression row controller 103. Cluster readout circuits 111 within the same row may likewise be coupled to receive a shared set of column control signals from column controller 113, though a single shared/global set of column control signals may alternately be delivered (with buffer fan out as necessary) to the entire array of cluster readout circuits. Though not specifically shown, the illumination surface of the sensor die (frontside or backside) may be covered by a color filter array (e.g., to filter the wavelengths of light passed to individual pixels or groups of pixels according to a Bayer pattern or any other practicable color pattern) and/or micro-lens array (e.g., to focus light on photodetection regions within respective pixels). Also, image sensor 100 may be implemented in more or fewer than two dies in alternative embodiments (e.g., single-die integration, 3+ die stack, or die-stack plus one or more laterally disposed dies housed within a unifying integrated-circuit package, etc.).

Referring to expanded views 121 and 123 of respective sub-regions within a pixel cluster and corresponding cluster readout circuit, each column of pixels within a given pixel cluster is coupled via a shared column readout line 125 (and die-to-die interconnect in a stacked-die implementation) to a respective column readout circuit 127 within the corresponding cluster readout circuit. In one embodiment, individual pixels within each pixel column (i.e., as shown at 129 within detail view 131) include a respective photodetection element PD (e.g., pinned photodiode), transfer gate (TG), floating diffusion node (FD), amplifier transistor (SF), read-select transistor (RS) and reset transistor (RST) interconnected to form a 4-transistor (4T) active pixel. The transfer gate, read-select transistor and reset transistor for the pixels in each row of a given pixel cluster are sequentially activated (by like-named control signals asserted by dual-progression row controller 103) to effect pixel signal readout in which (i) each pixel in a RS-selected row drives successive reset-state and image-state signals (differentially indicative of photocharge accumulated within the photodetection element during a preceding exposure interval) onto the column-shared readout line 125 (i.e., "column-output" line) to be sampled and digitized by per-column signal processing circuitry within the corresponding column readout circuit 127. Dual progression row controller 107 enables sequential row-by-row column-parallel pixel signal output simultaneously within respective cluster groups (and thus simultaneously within all pixel clusters), progressing bidirectionally through the rows of pixels within each cluster such that the top row of pixels and bottom row of pixels within a given cluster are read out one after another (i.e., in immediate succession with no intervening row readout). As discussed in further detail below, this bidirectional row-scan dramatically reduces the readout time delay between neighboring rows of pixels in adjacent clusters, rendering artifacts otherwise perceptible in conventional single-scan sequences (e.g., where the objective scene is changing during the exposure due either to object motion, lighting change, etc.) imperceptible or otherwise negligible.

In the specific example shown, each column output line 121 is biased by a constant current source 135 (e.g., implemented within column readout circuit 127) so that, when the read-select transistor for a given pixel is switched on (coupling the source terminal of the in-pixel amplifier transistor SF to the column output line), any voltage change at the gate of transistor SF appears also at the source of that transistor (i.e., so as to maintain a constant gate-to-source voltage according to the current drawn by current source 135), thus effecting an in-pixel source-follower amplification scheme. In the NMOS-transistor (N-type MOSFET (metal-oxide-semiconductor field-effect transistor)) pixel embodiment shown, photoelectrons are accumulated within photodetector PD (e.g., a photodiode) during an exposure interval and then transferred to floating diffusion node FD during readout (i.e., via TG), thus lowering the FD voltage (which is reset to VDD or other pixel reset voltage prior to charge transfer) in proportion to photon flux (luminance intensity) incident upon the photodetector. That is, the pixel output voltage supplied to column readout circuit 127—first to programmable gain amplifier 137 (PGA) and then, after amplification within the PGA, to analog-to-digital converter 139 (ADC)— is negatively proportional to luminance intensity. A positively proportional pixel output may be generated in alternative embodiments (e.g., PMOS pixel implementation or in-pixel amplifier transistor SF configured in a common-source configuration in which the transistor drain drives the column output line) and pixels 129/image sensor 101 may be changed in various ways—e.g., FD/RST/SF shared among multiple PDs/TGs to reduce effective per-pixel transistor count, multiple readout paths per PD, selective in-pixel charge binning between multiple FDs, transistor-switched capacitance at FD node to effect dynamically selectable conversion gain, etc. In all such image sensor variants, dual progression row controller may be deployed to reduce inter-cluster readout skew.

In the FIG. 1 embodiment, PGA 137 responds to the incoming the pixel readout signal ($V_{in}$) and control signals/reference voltages from column control circuitry 133 (e.g., an enable-PG signal to cycle the PGA between reset and output phases) by outputting an amplified, possibly reverse-polarity analog readout signal ($V_{pg}$) to analog-to-digital converter (ADC) circuitry 141. In a single-slope ADC (SSADC) implementation, ADC 139 compares a voltage ramp (an incrementally-stepped sawtooth waveform, "Vramp") with the analog PGA output (Vpg), latching a count value (incremented with each Vramp step) as the multi-bit ADC result ($D_{out}$) in response to a ramp step that crosses Vpg (i.e., Vramp steps above Vpg in this example or stepping below Vpg in a reverse polarity implementation). In the FIG. 1 example, the ADC result ($D_{out}$) is transferred to a line memory (or buffer) 141, for eventual output to downstream processing circuitry on the sensor die 105, ASIC die 115 (or another die that forms part of image sensor 100) and/or implemented externally to the image sensor IC. The voltage ramp and count value may be generated by globally shared circuitry (ramp DAC and counter) within column control circuit 113 and/or by dedicated circuitry within each cluster readout circuit 111 (i.e., separate ramp generator and/or ramp counter implemented within each cluster readout circuit 111 and shared among the per-cluster column readout circuits 127 therein). More generally, various different column readout circuits may be deployed within column readout circuits in alternative embodiments—e.g., different pixel output amplification schemes, alternative ADC implementations (successive-approximation-register (SAR) sigma-delta, etc.), alternative programmable gain amplifier disposition or implementation (including omission thereof), alternative data buffering structures, etc.

Figure 2:
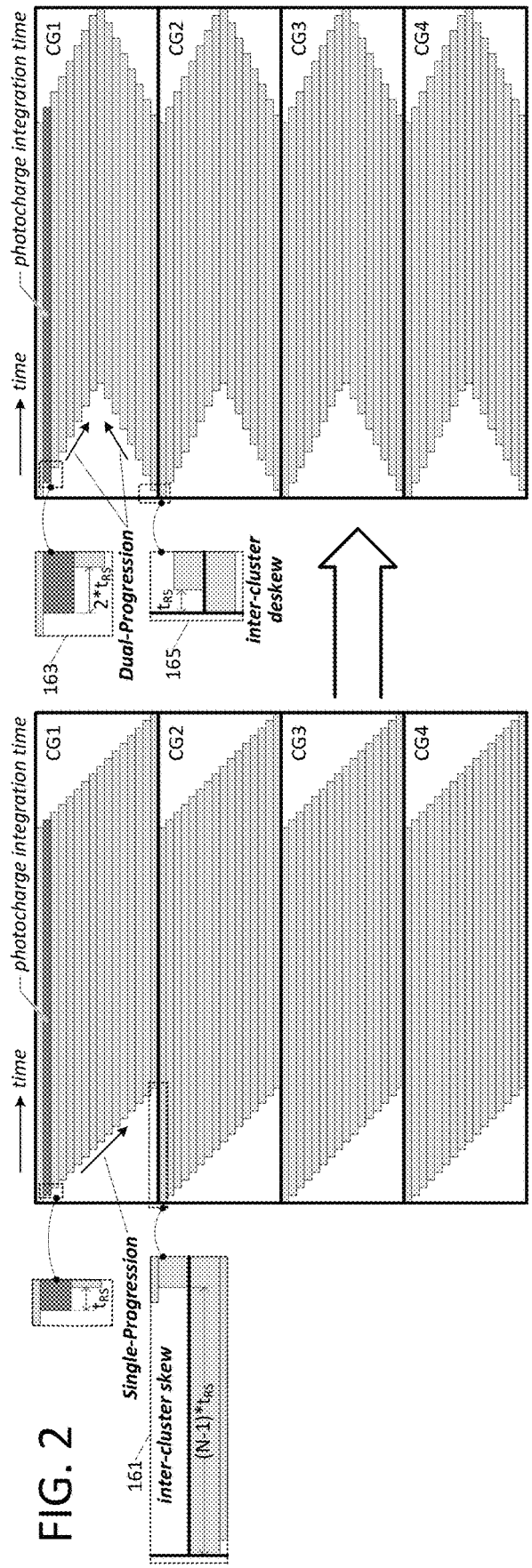
FIG. 2 contrasts the dual (bi-directional) per-cluster readout progression implemented by the row controller within the FIG. 1 image sensor with a single-progression (monotonic row sequence) readout.

FIG. 2 contrasts the dual (bi-directional) per-cluster readout progression implemented by row controller 103 within the FIG. 1 image sensor with a single-progression (monotonic row sequence) readout. In both the dual-progression and single-progression readout sequences, the 'N' rows of pixels within a given cluster group are read out in respective row-scan intervals ($t_{RS}$) that transpire one after another, with all cluster groups sequenced concurrently (simultaneously) to effect complete pixel array readout (e.g., for a given exposure or frame interval) over time period N*$t_{RS}$, where '*' denotes multiplication. Accordingly, the time delay between initial and final row readout is (N−1)*$t_{RS}$ as shown at 161, with the final row readout in the single-progression sequence occurring at a row (within three of the four cluster groups) that borders the much earlier initial row readout for the adjacent cluster group, thus yielding an undesirably large skew (N−1)*$t_{RS}$ between abutting rows in adjacent clusters (i.e., inter-cluster skew, boundary-row skew, border skew)—a temporal distortion potentially perceptible by a human or machine viewer of the finalized digital image, particularly in the case of intra-frame changes within the objective scene (i.e., moving object, panning camera/changing field-of-view, lighting transition, etc.). In the bi-directional/dual-progression implementation, by contrast, two arithmetic row progressions effected by the dual-progression row controller (element 103 of FIG. 1), one proceeding downward from the top row in a given cluster group and the other proceeding upward from the bottom row in the cluster group, are interleaved (alternated) such that (i) the two progressions converge to a final row readout in the center of the cluster ("center convergence"), (ii) the time between readout of two adjacent rows in the same progression (descending or ascending) is 2*$t_{RS}$ as shown at 163, and (iii) the time between readouts of abutting rows in adjacent clusters is reduced to a single row-scan time, $t_{RS}$ (i.e., reduced by a factor of N−1 relative to the single-progression approach), effecting an inter-cluster deskew as shown at 165.

As discussed below, the outside-in (dual) shutter progressions shown in FIG. 2 (also referred to as a center-converging cluster readout, and more generally an inter-cluster deskew shutter progression or interleaved dual-progression readout) may alternatively progress from an interior row toward upper and lower boundary rows and/or may vary from cluster group to cluster group (e.g., to yield simultaneous readouts of abutting rows in adjacent clusters) or even include more than two progressions per cluster group. In all such dual or multi-progression implementations, inter-cluster skew is dramatically reduced (e.g., to zero, or by a factor of N−1) and the worst-case skew between adjacent-row readouts is reduced to a negligible/imperceptible level (e.g., $2*t_{RS}$ in dual-progression implementations).

Figure 3:
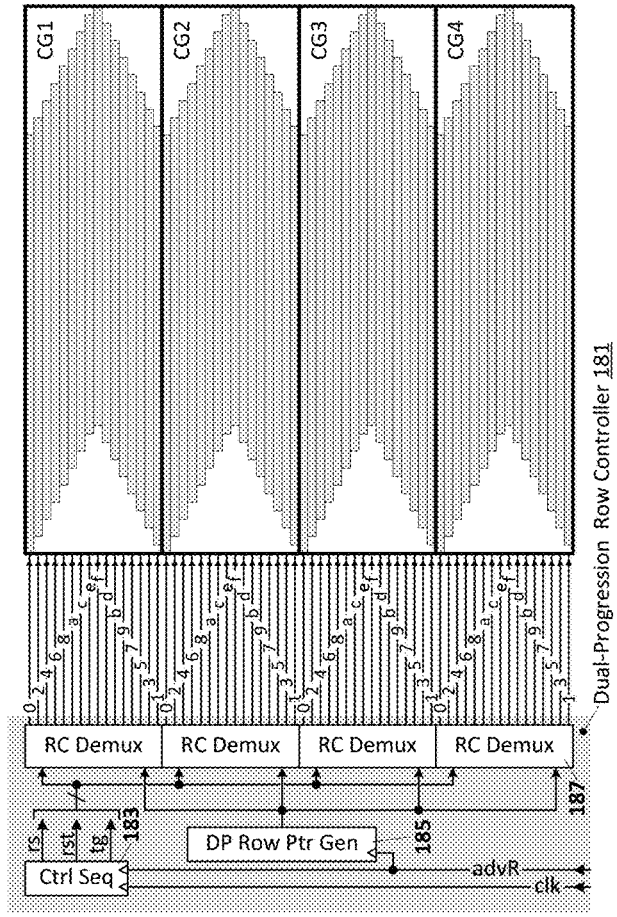
FIG. 3 illustrates a more detailed embodiment of an outside-in ("center-converge"), dual-progression row controller within a sensor die having an exemplary set of four pixel-cluster groups.

FIG. 3 illustrates a more detailed embodiment of an outside-in, dual-progression row controller 181 within a sensor die having four pixel-cluster groups, CG1-CG4 (there may be more or fewer than four cluster groups in alternative embodiments). In the depicted example, row controller 181 receives a clock signal, "clk," and row-advance signal, "advR" (e.g., from timing control circuitry on the sensor die or another die—the ASIC die shown in FIG. 1 for example), and includes a control-signal sequencer 183, dual-progression row pointer generator 185 and row-control-signal demultiplexers 187, one row-control-signal demultiplexer ("RC Demux") for each cluster group and thus four demultiplexers 187 in this four-CG example. Control-signal sequencer 183 generates readout-control signal pulses on controller-internal row-select, reset and transfer-gate nodes ("rs," "rst," "tg") at respective clock counts as necessary to readout a selected row of pixels (e.g., asserting a row-select signal on internal node "rs" throughout the row readout interval to enable a selected row of pixels to drive respective column output lines, pulsing a reset signal on internal node "rst" to enable a reset-state of the selected-row pixel FD nodes to be sampled by corresponding column readout circuits, pulsing a transfer-gate signal on internal node "tg" to effect photocharge transfer from PD to FD within the selected row of pixels and thus enable respective image-state signals corresponding to the the pixel FD nodes to be sampled by the column readout circuits as part of a correlated double sampled (CDS) pixel readout), while dual-progression row pointer generator 185 and control-signal demultiplexers 187 implement the bi-directional (outside-in) row scan sequence discussed in reference to FIGS. 1 and 2. More specifically, dual-progression row pointer generator 185 generates a sequence of row pointers (or pixel-row addresses, or row addresses or row numbers) that alternately progresses from both minimum and maximum pointer values toward a center row pointer value, advancing from one row in the bidirectional sequence to the next row in response to each cycle of the row-advance signal (alternatively, row pointer generator 185 may internally count cycles of the clock signal, advancing the row pointer after every $t_{RS}/t_{CK}$ clock cycles, where $t_{CK}$ is the period of clock signal, clk). Each of the row-control-signal demultiplexers 186 distributes the readout control signals onto a respective set of row-dedicated control signal lines (one each for the transfer-gate, reset and read-select signals) for the individual rows of pixels during each row scan interval ($t_{RS}$), proceeding from one row to the next (i.e., from the control signal lines for one row to the control signal lines for the next row in the dual-progression sequence) with each row pointer advance—a sequence enumerated from 0x0 to 0xf in the FIG. 3 example to show the dual, outside-in, row pointer progression (where the '0x' prefix denotes hexadecimal/base-16 numbering). The sixteen-rows depicted per cluster group are merely an example—in actual implementation there may be thousands, tens of thousands, or more rows per cluster group.

Figure 4:
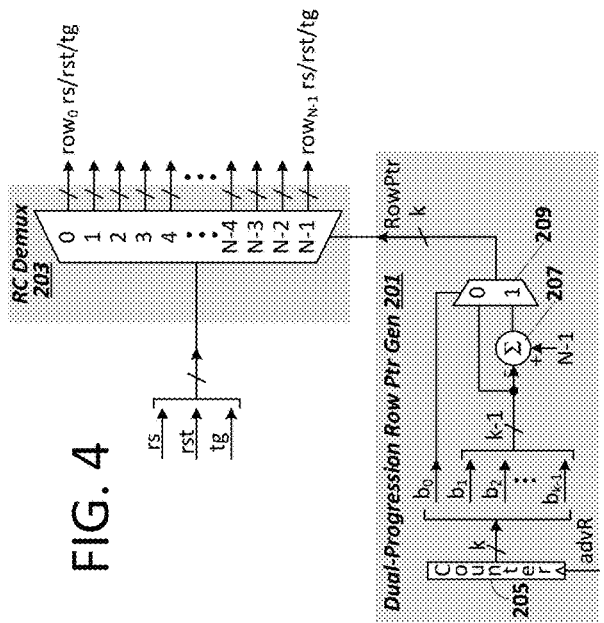
FIG. 4 illustrates embodiments of an outside-in dual-progression row pointer generator and row-control-signal demultiplexer.

FIG. 4 illustrates embodiments of an outside-in dual-progression row pointer generator 201 and row-control-signal (RC) demultiplexer 203 (e.g., that may implement like-named components in FIG. 3), with the former including a modulo-N counter 205, subtraction circuit 207 and multiplexer 209. Counter 205 outputs a k-bit count value (i.e., incrementing the count from 0 to N−1 and then rolling over to 0, where 'N' is the per-cluster row count and k=log$_2$(N)) in which the least-significant bit ($b_0$) is supplied to the select-input of multiplexer 209 and the most significant N−1 bits (effectively, the count value integer-divided by two) are supplied, as an ascending count sequence, to a first one of the two multiplexer inputs (supplying a zero-valued most-significant bit to yield a k-bit row-pointer value) and also to subtraction circuit 207. Subtraction circuit 207 subtracts the divided-by-two count output (i.e., counter output bits $b_1$-$b_{N-1}$) from a fixed "N−1" value to produce a descending count sequence at the second input of multiplexer 209. By this arrangement, the least significant bit of the count value toggles at each advR cycle to alternately select, via multiplexer 209, the ascending and descending count progressions as the row pointer output and thus produce the dual-progression (outside-in) row sequencing discussed above. Row-control-signal demultiplexer 203 (only one of multiple per-cluster-group implementations shown) responds to the incoming row pointer by routing internal-node row control signals (shown as read-select, reset and transfer-gate signals in this example) to the row-pointer-specified set of row signal lines (i.e., set of signal lines for pixel row specified by row pointer in a given row-scan interval) for the corresponding cluster group. As discussed above, the row control signals may include alternative and/or additional control signals in alternative embodiments (e.g., dynamic-gain control signal to switchably couple/decouple additional capacitance to the in-pixel FD node and thus effect readouts with different conversion gains, charge-binning control signals enable photocharge from multiple different photodetectors to be combined and/or to switchably couple two or more floating diffusion nodes together, additional per-pixel transfer-gate control signals, etc.). Also, the dual-progression sequence implemented by subtraction circuit 207 and multiplexer 209 may be implemented by alternative logic circuitry (e.g., subtraction circuit 207 replaced by inverter/one's-complement circuitry as the ascending progression is, at least in some cases, the logical complement of the descending progression), lookup table with fixed or programmed multi-progression row-pointer sequences, etc.

Figure 5:
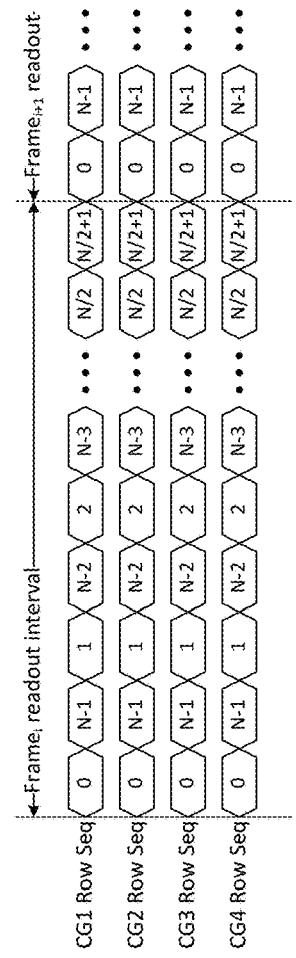
FIG. 5 illustrates the outside-in row-scan sequence generated by the FIG. 4 row-pointer generator in combination with multiple per-cluster-group instances of control-signal demultiplexer.

FIG. 5 illustrates the outside-in row-scan sequence generated by the FIG. 4 row-pointer generator in combination with multiple (four in this example) per-cluster-group instances of control-signal demultiplexer. As shown, adjacent rows within a cluster group are readout in every other row interval ($2*t_{RS}$ skew or stagger between adjacent-row readout), with the dual (bi-directional) progressions converging at a center row within the cluster group. As the readout sequence is executed concurrently and uniformly in all cluster groups, the skew between boundary row readouts (e.g., row 0 in cluster group CG2 and row N−1 in cluster group CG1) is limited to a singe row-scan interval ($t_{RS}$), eliminating the much more substantial (and perceptible) $t_{RS}*(N-1)$ inter-cluster skew that plagues conventional single-progression/unidirectional readout schemes.

Figure 6:
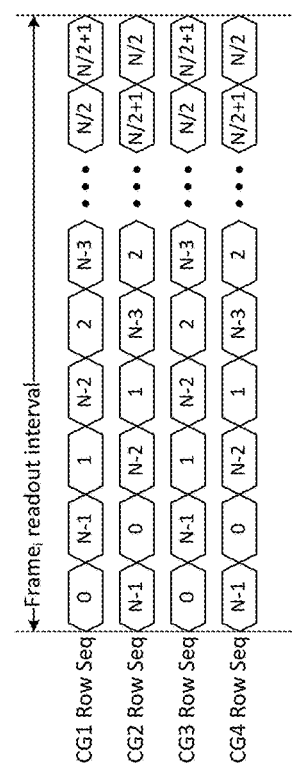
FIG. 6 illustrates an alternative outside-in row pointer progression in which the odd-row/even-row alternation sequence is altered from cluster-group to cluster-group to yield simultaneous boundary row readout.

FIG. 6 illustrates an alternative outside-in row pointer progression in which the odd-row/even-row alternation sequence is altered from cluster-group to cluster-group (non-uniform sequencing within adjacent cluster groups) to yield simultaneous boundary row readout.

Figure 7:
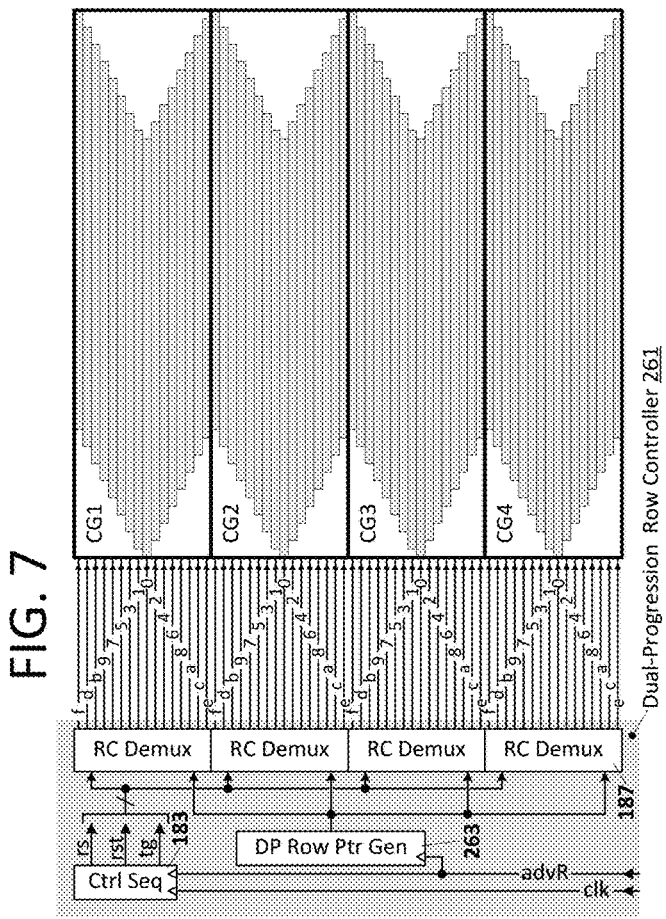
FIG. 7 illustrates an embodiment of an inside-out ("center-diverge"), dual-progression row controller within a sensor die having an exemplary set of four pixel-cluster groups.

FIG. 7 illustrates an embodiment of an inside-out ("center-diverge"), dual-progression row controller 261 within a sensor die having an exemplary set of four pixel-cluster groups (CG1-CG4). As in the FIG. 3 example, row controller 261 receives a clock signal and row-advance signal (the latter of which may instead be synthesized within the row controller as discussed), and includes a control-signal sequencer 183, dual-progression row pointer generator 263 and row-control-signal demultiplexers 187 (one demultiplexer 187 per cluster group and thus four in this 4-CG example). The control-signal sequencer 183 and demultiplexers 187 operate generally as discussed in reference to FIG. 3 (with all discussed variants applicable equally within row controller 261), while the dual-progression row pointer generator 263 implements an inside-out dual-progression (or diverge from center) row scan sequence—a sequence of row pointers that alternately ascend and descend from a center row pointer value, advancing from one row in the bidirectional sequence to the next row in response to each cycle of the row-advance signal. As in FIG. 3, the row-control-signal demultiplexers demultiplex the readout control signals onto respective sets of row-dedicated control signal lines (one each for the transfer-gate, reset and read-select signals) for the individual rows of pixels, proceeding bidirectionally from one row to the next with each row pointer advance—a sequence enumerated from 0x0 to 0xf in the FIG. 7 example to show the dual, inside-out, row pointer (shutter) progression, though in actual implementation there will be thousands, tens of thousands, or more rows per cluster group.

Figure 8:
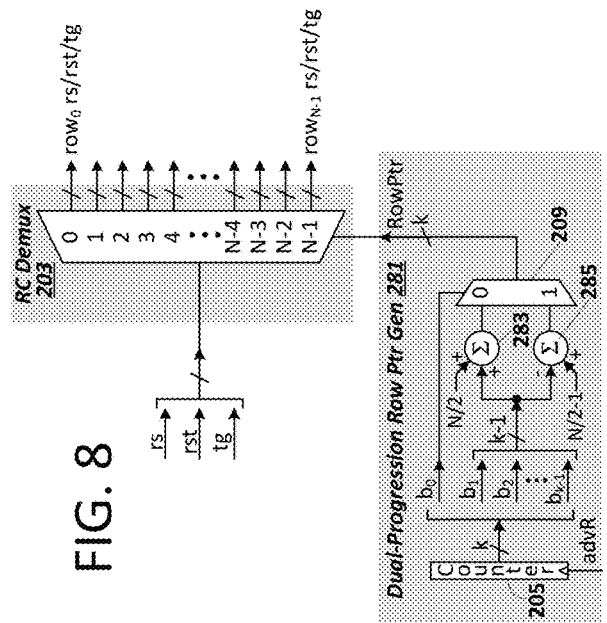
FIG. 8 illustrates embodiments of an inside-out dual-progression row pointer generator and row-control-signal demultiplexer.

FIG. 8 illustrates embodiments of an inside-out dual-progression row pointer generator 281 and row-control-signal (RC) demultiplexer 203 (that may implement like-named components in FIG. 7), with the former including a modulo-N counter 205, adder circuit 283, subtraction circuit 285 and multiplexer 209. Counter 205 outputs a k-bit count value (i.e., incrementing from 0 to N−1 and then rolling over to 0, where 'N' is the per-cluster row count and $k=\log_2(N)$) in which the least-significant bit (b0) is supplied to the select-input of multiplexer 209 and the most significant N−1 bits (effectively, the count value integer-divided by two) are supplied, as an ascending count sequence, to both adder circuit 283 and subtraction circuit 285. Adder circuit implements the descending row-pointer progression (from center row to lower boundary of cluster group) by adding the divided-by-two count output to center-row index ("N/2"), while subtraction circuit implements the ascending row-pointer progression (from center-row minus 1 and thus N/2-1) by subtracting the divided-by-two count output from row index N/2-1. The ascending and descending row-pointer progressions are supplied to alternate inputs of multiplexer 209 so that, as the least significant bit of the count value toggles at each advR cycle, multiplexer 209 alternately selects the ascending and descending count progressions as the row pointer output and thus produces the inside-out dual-progression row sequencing discussed above. Control-signal demultiplexer 203—only one instance shown of multiple per-cluster-group implementations—operates as discussed in reference to FIG. 3 by routing row control signals (shown as read-select, reset and transfer-gate signals in this example) to the row-pointer-specified set of row signal lines (i.e., set of signal lines for pixel row specified by row pointer in a given row-scan interval) for the corresponding cluster group. As discussed above, the row control signals may include alternative and/or additional control signals in alternative embodiments. Also, the dual-progression sequence implemented by adder circuit 283, subtraction circuit 285 and multiplexer 209 may be implemented by alternative logic circuitry (e.g., subtraction circuit 285 replaced by inverter/one's-complement circuitry with zero-valued most-significant bit; adder circuit implemented or replaced by merging logic '1' most-significant-bit with the divided-by-two count value), lookup table with fixed or programmable multi-progression row-pointer sequences, etc.

Figure 9:
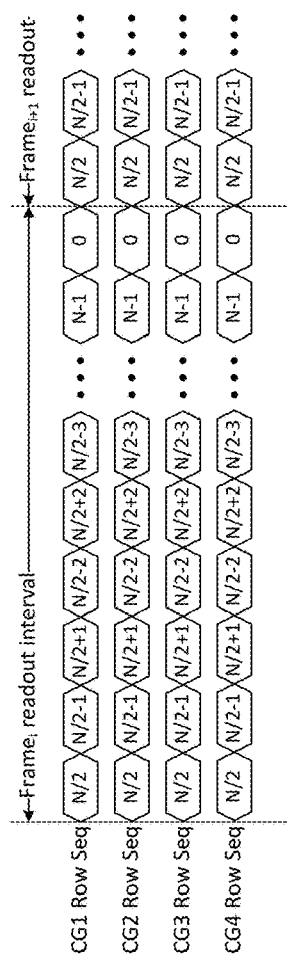
FIG. 9 illustrates the inside-out row sequence generated by the FIG. 8 row-pointer generator in combination with multiple per-cluster-group instances of control-signal demultiplexer.

FIG. 9 illustrates the inside-out row sequence generated by the FIG. 8 row-pointer generator in combination with multiple (four in this example) per-cluster-group instances of control-signal demultiplexer. As shown, adjacent rows within a cluster group are readout in every other row interval ($2*t_{RS}$ skew or stagger between adjacent-row readout), with the dual (bi-directional) readout progressions diverging toward alternate boundary (limit or outer extreme) rows within the cluster group. As the readout sequence is executed concurrently and uniformly in all cluster groups, the skew between boundary row readouts (e.g., row N−1 in cluster group CG1 and row 0 in cluster group CG2) is limited to $t_{RS}$.

Figure 10:
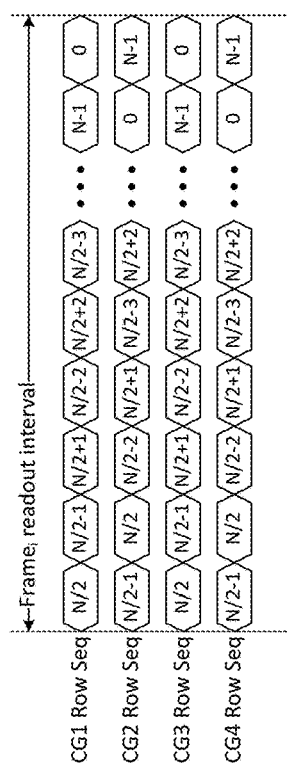
FIG. 10 illustrates an alternative inside-out row pointer progression in which the odd-row/even-row alternation sequence is altered from cluster-group to cluster-group (non-uniform sequencing within adjacent cluster groups) to yield simultaneous boundary row readout.

FIG. 10 illustrates an alternative inside-out row pointer progression in which the odd-row/even-row alternation sequence is altered from cluster-group to cluster-group (non-uniform sequencing within adjacent cluster groups) to yield simultaneous boundary row readout. In the FIG. 10 embodiment and all embodiments herein, additional image processing may be carried out to further reduce row-to-row and/or inter-cluster skew (e.g., software-based deskew). Such image processing may be carried out by special-purpose or general-purpose processing circuitry within the image sensor (e.g., integrated within the ASIC die and/or sensor die discussed in reference to FIG. 1), within one or more additional integrated circuit dies integrated within the image sensor package (e.g., in a system-on-chip), and/or within processing circuitry external to the image sensor package and to which sensor read-out data (image data) is conveyed.

The various pixel circuit architectures and layouts, pixel implementations, control signal sequences, pixel-cluster organizations, die-stack arrangements, multi-progression row control circuits, etc. disclosed herein may be described using computer aided design tools and expressed (or represented), as data and/or instructions embodied in various computer-readable media, in terms of their behavioral, register transfer, logic component, transistor, layout geometries, and/or other characteristics. Formats of files and other objects in which such circuit, layout, and architectural expressions may be implemented include, but are not limited to, formats supporting behavioral languages such as C, Verilog, and VHDL, formats supporting register level description languages like RTL, and formats supporting geometry description languages such as GDSII, GDSIII, GDSIV, CIF, MEBES and any other suitable formats and languages. Computer-readable media in which such formatted data and/or instructions may be embodied include, but are not limited to, computer storage media in various forms (e.g., optical, magnetic or semiconductor storage media, whether independently distributed in that manner, or stored "in situ" in an operating system).

When received within a computer system via one or more computer-readable media, such data and/or instruction-based expressions of the above described circuits and device architectures can be processed by a processing entity (e.g., one or more processors) within the computer system in conjunction with execution of one or more other computer programs including, without limitation, net-list generation programs, place and route programs and the like, to generate a representation or image of a physical manifestation of such circuits and architectures. Such representation or image can thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the disclosed embodiments. In some instances, the terminology and symbols may imply details not required to practice those embodiments. For example, any of the specific quantities/types of photodetection elements, photocarrier polarity, pixel architectures, pixel cluster architectures, numbers of pixel clusters per pixel array, number of cluster groups per pixel array, numbers of rows of pixels per pixel cluster, pixel array readout architectures (e.g., multi-progression/bi-directional row-pointer sequencing), signal polarities, transistor types (PMOS vs. NMOS) and the like can be different from those described above in alternative embodiments. Signal paths depicted or described as individual signal lines may instead be implemented by multi-conductor signal buses and vice-versa and may include multiple conductors per conveyed signal (e.g., differential or pseudo-differential signaling). The term "coupled" is used herein to express a direct connection as well as a connection through one or more intervening functional components or structures. Programming of operational parameters (e.g., dual or multi-progression vs. single progression, inside-out vs. outside-in, etc.) or any other configurable parameters may be achieved, for example and without limitation, by loading a control value into a register or other storage circuit within above-described integrated circuit devices in response to a host instruction and/or on-board processor or controller (and thus controlling an operational aspect of the device and/or establishing a device configuration) or through a one-time programming operation (e.g., blowing fuses within a configuration circuit during device production), and/or connecting one or more selected pins or other contact structures of the device to reference voltage lines (also referred to as strapping) to establish a particular device configuration or operation aspect of the device. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An integrated-circuit image sensor, comprising:
   a pixel array having rows of pixels organized in a plurality of clusters defined by respective subsets of the rows of pixels; and
   row-select circuits coupled respectively to the subsets of the rows of pixels, each of the row-select circuits operable in parallel to generate a respective sequence of pixel-row addresses to select rows of pixels for readout within the respective subset of the rows of pixels, wherein the respective sequence of pixel-row addresses alternates between descending pixel-row addresses and ascending pixel-row addresses in a center-converge pattern or a center-diverge pattern.

2. The integrated-circuit image sensor of claim 1, wherein the descending pixel-row addresses and the ascending pixel-row addresses correspond respectively to nonoverlapping first and second regions of the respective subset of the rows of pixels.

3. The integrated-circuit image sensor of claim 1, wherein the descending pixel-row addresses alternate with the ascending pixel-row addresses, such that within the respective sequence of pixel-row addresses, a constituent pixel-row address of the descending pixel-row addresses is immediately succeeded by a constituent pixel-row address of the ascending pixel-row addresses and vice-versa.

4. The integrated-circuit image sensor of claim 1, wherein the respective sequence of pixel-row addresses is within a continuous range of pixel-row addresses bounded by a minimum pixel-row address and a maximum pixel-row address, wherein in the center-converge pattern, the descending pixel-row addresses commences from the maximum pixel-row address and the ascending pixel-row addresses commences from the minimal pixel-row address.

5. The integrated-circuit image sensor of claim 1, wherein the respective subsets of the rows of pixels comprises at least a first subset of the rows of pixels abutting a second subset of the rows of pixels, wherein the row-select circuits are configured to generate a first sequence of pixel-row addresses for the first subset and a second sequence of pixel-row addresses for the second subset, and wherein in the center-converge pattern, the first sequence of pixel-row addresses commences from a constituent pixel-row address of the ascending pixel-row addresses and the second sequence of pixel-row addresses commences from a constituent pixel-row address of the descending pixel-row addresses.

6. The integrated-circuit image sensor of claim 1, wherein the respective sequence of pixel-row addresses is within a continuous range of pixel-row addresses bounded by a minimum pixel-row address and a maximum pixel-row address, wherein in the center-diverge pattern, the descending pixel-row addresses concludes at the minimum pixel-row address and the ascending pixel-row addresses concludes at the maximum pixel-row address.

7. The integrated-circuit image sensor of claim 1, wherein the respective subsets of the rows of pixels comprises at least a first subset of the rows of pixels abutting a second subset of the rows of pixels, wherein the row-select circuits are configured to generate a first sequence of pixel-row addresses for the first subset and a second sequence of pixel-row addresses for the second subset, and wherein in the center-diverge pattern, the first sequence of pixel-row addresses concludes at a constituent pixel-row address of the descending pixel-row addresses and the second sequence of pixel-row addresses concludes at a constituent pixel-row address of the ascending pixel-row addresses.

8. The integrated-circuit image sensor of claim 1, further comprising control circuitry configured to read out imaging information from respective rows of pixels within the pixel array in accordance with respective sequences of pixel-row addresses.

9. The integrated-circuit image sensor of claim 8, wherein the control circuitry reads out the imaging information during a row-scan interval from a respective row of pixels simultaneously.

10. A method, comprising:
generating, using each of row-select circuits coupled respectively to respective subsets of rows of pixels of a pixel array of an image sensor and operable in parallel, a respective sequence of pixel-row addresses to select rows of pixels for readout within the respective subset of the rows of pixels, wherein the respective sequence of pixel-row addresses alternates between descending pixel-row addresses and ascending pixel-row addresses in a center-converge pattern or a center-diverge pattern.

11. The method of claim 10, wherein the descending pixel-row addresses and the ascending pixel-row addresses correspond respectively to nonoverlapping first and second regions of the respective subset of the rows of pixels.

12. The method of claim 10, wherein the descending pixel-row addresses alternate with the ascending pixel-row addresses, such that within the respective sequence of pixel-row addresses, a constituent pixel-row address of the descending pixel-row addresses is immediately succeeded by a constituent pixel-row address of the ascending pixel-row addresses and vice-versa.

13. The method of claim 10, wherein the respective sequence of pixel-row addresses is within a continuous range of pixel-row addresses bounded by a minimum pixel-row address and a maximum pixel-row address, wherein in the center-converge pattern, the descending pixel-row addresses commences from the maximum pixel-row address and the ascending pixel-row addresses commences from the minimal pixel-row address.

14. The method of claim 10, wherein the respective subsets of the rows of pixels comprises at least a first subset of the rows of pixels abutting a second subset of the rows of pixels, wherein the method comprises generating a first sequence of pixel-row addresses for the first subset and a second sequence of pixel-row addresses for the second subset, and wherein in the center-converge pattern, the first sequence of pixel-row addresses commences from a constituent pixel-row address of the ascending pixel-row addresses and the second sequence of pixel-row addresses commences from a constituent pixel-row address of the descending pixel-row addresses.

15. The method of claim 10, wherein the respective sequence of pixel-row addresses is within a continuous range of pixel-row addresses bounded by a minimum pixel-row address and a maximum pixel-row address, wherein in the center-diverge pattern, the descending pixel-row addresses concludes at the minimum pixel-row address and the ascending pixel-row addresses concludes at the maximum pixel-row address.

16. The method of claim 10, wherein the respective subsets of the rows of pixels comprises at least a first subset of the rows of pixels abutting a second subset of the rows of pixels, wherein the method comprises generating a first sequence of pixel-row addresses for the first subset and a second sequence of pixel-row addresses for the second subset, and wherein in the center-diverge pattern, the first sequence of pixel-row addresses concludes at a constituent pixel-row address of the descending pixel-row addresses and the second sequence of pixel-row addresses concludes at a constituent pixel-row address of the ascending pixel-row addresses.

17. The method of claim 10, further comprising:
reading out, using control circuitry of the image sensor, imaging information from respective rows of pixels within the pixel array in accordance with respective sequences of pixel-row addresses.

18. The method of claim 17, wherein reading out the image information comprises reading out the imaging information during a row-scan interval from a respective row of pixels simultaneously.

19. An image sensor, comprising:
a pixel array having rows of pixels organized in a plurality of clusters defined by respective subsets of the rows of pixels;
row-select circuits coupled respectively to the subsets of the rows of pixels, each of the row-select circuits operable in parallel to generate a respective sequence of pixel-row addresses to select rows of pixels for readout within the respective subset of the rows of pixels, wherein the respective sequence of pixel-row addresses alternates between descending pixel-row addresses and ascending pixel-row addresses in a center-converge pattern or a center-diverge pattern; and
control circuitry configured to read out imaging information from respective rows of pixels within the pixel array in accordance with respective sequences of pixel-row addresses.

20. The image sensor of claim 19, wherein the descending pixel-row addresses and the ascending pixel-row addresses correspond respectively to nonoverlapping first and second regions of the respective subset of the rows of pixels, and wherein the descending pixel-row addresses alternate with the ascending pixel-row addresses, such that within the respective sequence of pixel-row addresses, a constituent pixel-row address of the descending pixel-row addresses is immediately succeeded by a constituent pixel-row address of the ascending pixel-row addresses and vice-versa.

* * * * *